US012679378B2

(12) United States Patent
Teramachi

(10) Patent No.: US 12,679,378 B2
(45) Date of Patent: Jul. 14, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Tomotaka Teramachi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/056,809

(22) Filed: Feb. 19, 2025

(65) Prior Publication Data

US 2025/0282359 A1 Sep. 11, 2025

(30) Foreign Application Priority Data

Mar. 7, 2024 (JP) ................................. 2024-035384

(51) Int. Cl.
*B60W 30/18* (2012.01)
*B60W 10/20* (2006.01)
(Continued)

(52) U.S. Cl.
CPC ...... *B60W 30/18163* (2013.01); *B60W 10/20* (2013.01); *B60W 30/12* (2013.01);
(Continued)

(58) Field of Classification Search
CPC ........... B60W 30/18163; B60W 10/20; B60W 30/12; B60W 30/16; B60W 2420/403;
(Continued)

(56) References Cited

U.S. PATENT DOCUMENTS 12,515,674 B2 * 1/2026 Inaba .................... B60W 40/06
2018/0148060 A1 * 5/2018 Hashimoto ..... B60W 30/18163
(Continued)

FOREIGN PATENT DOCUMENTS

JP 2004-189101 7/2004
JP 2017-074823 4/2017
(Continued)

OTHER PUBLICATIONS

Japanese Office Action for Japanese Patent Application No. 2024-035384 mailed Aug. 26, 2025.
(Continued)

*Primary Examiner* — Sizo B Vilakazi
(74) *Attorney, Agent, or Firm* — Amin, Turocy & Watson, LLP

(57) ABSTRACT

A vehicle-control-device automatically controls steering of a vehicle and performs automatic lane-change based on a surrounding-situation and instruction information that is a lane-change instruction. The instruction information includes first-instruction-information transmitted in response to an operation of a first operator and second-instruction-information transmitted in response to an operation of a second operator. The vehicle-control-device executes first-lane-change-control of causing the vehicle to change a lane to an adjacent-lane in the case in which it is determined that a lane-change is possible on the basis of the surrounding-situation when the first-instruction-information is acquired, and transitions to a standby-state of the lane-change in response to acquisition of the second-instruction-information, maintains the standby-state until the lane-change becomes possible based on the surrounding-situation, and when it is determined that the lane-change became possible based on the surrounding-situation in the
(Continued)

standby-state, and executes second-lane-change-control of causing the vehicle to change the lane to the adjacent-lane.

14 Claims, 8 Drawing Sheets

(51) Int. Cl.
*B60W 30/12* (2020.01)
*B60W 30/16* (2020.01)
*G06V 20/58* (2022.01)

(52) U.S. Cl.
CPC ............. *B60W 30/16* (2013.01); *G06V 20/58* (2022.01); *B60W 2420/403* (2013.01); *B60W 2554/4041* (2020.02); *B60W 2554/801* (2020.02)

(58) Field of Classification Search
CPC ... B60W 2554/4041; B60W 2554/801; B60W 2540/20; B60W 50/14; B60W 50/08; G06V 20/58

See application file for complete search history.

(56) References Cited

U.S. PATENT DOCUMENTS

| | | | |
|---|---|---|---|
| 2020/0247414 A1* | 8/2020 | Ishioka ................. | B60W 50/14 |
| 2022/0203993 A1* | 6/2022 | Taniguchi ........... | B60W 30/143 |
| 2022/0204054 A1* | 6/2022 | Taniguchi ............. | G08G 1/167 |
| 2022/0315001 A1* | 10/2022 | Hirosawa ............. | B60W 50/14 |
| 2023/0174070 A1* | 6/2023 | Oniwa ................. | B60W 50/14 |
| | | | 701/41 |

FOREIGN PATENT DOCUMENTS

| | | |
|---|---|---|
| JP | 2017-140997 | 8/2017 |
| JP | 2018-086966 | 6/2018 |
| JP | 2018-095202 | 6/2018 |
| JP | 2018-203120 | 12/2018 |
| JP | 2020-154468 | 9/2020 |
| JP | 7140277 | 9/2022 |
| JP | 2022-157796 | 10/2022 |
| JP | 2023-082951 | 6/2023 |
| WO | 2020/230304 | 11/2020 |

OTHER PUBLICATIONS

Japanese Office Action for Japanese Patent Application No. 2024-035384 mailed Dec. 2, 2025.

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2024-035384, filed Mar. 7, 2024, the content of which is incorporated herein by reference.

BACKGROUND OF THE INVENTION

Field of the Invention

The present invention relates to a vehicle control device, a vehicle control method, and a storage medium.

Description of Related Art

In recent years, there have been increasing attempts to provide sustainable transportation systems that take into account various situations. To achieve this, research and development into driver assistance technology to further improve traffic safety and convenience has been focused upon. For example, a travel control device has been disclosed that performs an automatic lane change when a system proposes a lane change and the proposal is accepted, or when a driver operates a direction instruction lever (for example, see WO2020/230304).

SUMMARY OF THE INVENTION

In the technology in the related art, a vehicle was sometimes not convenient enough for an occupant (for example, a driver). For example, there was only one type of lane change that could be performed in response to the driver's intentions, and it was not possible to realize an automatic lane change that reflected the driver's intentions, which sometimes made the system inconvenient.

An aspect of the present invention is directed to providing a vehicle control device, a vehicle control method, and a storage medium that are capable of improving convenience for an occupant (for example, driver) of a vehicle. Further, an aspect of the present invention is directed to contributing to development a sustainable transportation system.

A vehicle control device, a vehicle control method, and a storage medium according to the present invention employ the following configurations.

(1) A vehicle control device according to an aspect of the present invention includes: a recognition part configured to recognize a surrounding situation of a vehicle; and a controller configured to automatically control steering of the vehicle and perform automatic lane change on the basis of the surrounding situation recognized by the recognition part and instruction information that is a lane change instruction, the instruction information including first instruction information transmitted in response to an operation of a first operator and second instruction information transmitted according to an operation of a second operator different from the first operator, and the controller executing first lane change control of causing the vehicle to change lane to an adjacent lane in the case in which it is determined that lane change is possible on the basis of the surrounding situation when the first instruction information is acquired according to acquisition of the first instruction information, and transitioning to a standby state of lane change in response to acquisition of the second instruction information, maintaining the standby state until lane change becomes possible on the basis of the surrounding situation, and when it is determined that lane change became possible on the basis of the surrounding situation in the standby state, executing second lane change control of causing the vehicle to change lane to the adjacent lane.

(2) In the aspect of the above-mentioned (1), the controller turns on a direction indicator when the first operator is operated.

(3) In the aspect of the above-mentioned (1), when the second operator is operated, the controller does not turn on a direction indicator from the time when the operation of the second operator was performed until the standby state ends, and turns on the direction indicator after the standby state has ended.

(4) In the aspect of the above-mentioned (3), when the controller determined that the lane change is possible on the basis of the surrounding situation in the standby state of the second lane change control, the controller turns on the direction indicator before a predetermined time at which the controller causes the vehicle to start change of the lane to the adjacent lane.

(5) In the aspect of the above-mentioned (1), the controller determines that the lane change is possible when a first condition is satisfied and executes the first lane change control, and determines that the lane change is possible when a second condition that is more severe to satisfy than the first condition is satisfied and executes the second lane change control.

(6) In the aspect of the above-mentioned (5), the first condition and the second condition is to satisfy one or both of: a distance in a direction of advance of the vehicle between the vehicle and another vehicle existing in a lane of a lane change destination of the vehicle is equal to or greater than a first threshold, and a time it takes for the other vehicle to reach a reference position set with respect to the vehicle is equal to or greater than a second threshold.

(7) In the aspect of the above-mentioned (1), the first operator is a turn signal lever switch, and the second operator is a button switch.

(8) In the aspect of the above-mentioned (1), the controller causes the vehicle to maintain the lane in which the vehicle is traveling when it is determined that the lane change is not possible on the basis of the surrounding situation at the time of receiving the first instruction information, in response to acquisition of the first instruction information.

(9) In the aspect of the above-mentioned (1), the controller causes the vehicle to maintain the lane in which the vehicle is traveling in the standby state of the second lane change control.

(10) In the aspect of the above-mentioned (1), the controller cancels execution of the second lane change control in response to acquisition of the second instruction information when the standby state has continued for a predetermined time or when the vehicle has traveled a predetermined distance in the standby state.

(11) In the aspect of the above-mentioned (1), in the standby state of the lane change, the second lane change control maintains a standby state until the lane change is possible even in a situation in which it is determined that the lane change is not possible due to existence of another vehicle present around the vehicle that is the surrounding situation, and causes the vehicle to change the lane to an adjacent lane when it is determined that the lane change is possible on the basis of the surrounding situation in the standby state.

(12) In the aspect of the above-mentioned (1), the first lane change control causes the vehicle to change the lane after a first time elapses from acquisition of the first instruction information when there is no vehicle around the vehicle that could interfere with the lane change of the vehicle, and the second lane change control causes the vehicle to change the lane after a second time elapses from acquisition of the second instruction information when there are no vehicles around the vehicle that could interfere with the lane change of the vehicle in the standby state of the lane change, and the second time is a time greater than the first time.

(13) A vehicle control method according to another aspect of the present invention is a vehicle control method of causing a computer to: recognize a surrounding situation of a vehicle; automatically control steering of the vehicle and perform automatic lane change on the basis of the recognized surrounding situation and instruction information that is a lane change instruction, the instruction information including first instruction information transmitted in response to an operation of a first operator and second instruction information transmitted in response to an operation of a second operator different from the first operator, and execute first lane change control of causing the vehicle to change a lane to an adjacent lane in the case in which it is determined that a lane change is possible on the basis of the surrounding situation when the first instruction information is acquired according to acquisition of the first instruction information, and transition to a standby state of the lane change in response to acquisition of the second instruction information, maintain the standby state until the lane change becomes possible on the basis of the surrounding situation, and when it is determined that the lane change became possible on the basis of the surrounding situation in the standby state, execute second lane change control of causing the vehicle to change the lane to the adjacent lane.

(14) A storage medium according to another aspect of the present invention is a computer-readable non-transitory storage medium on which a program is stored to cause a computer to: recognize a surrounding situation of a vehicle; automatically control steering of the vehicle and perform automatic lane change on the basis of the recognized surrounding situation and instruction information that is a lane change instruction, the instruction information including first instruction information transmitted in response to an operation of a first operator and second instruction information transmitted in response to an operation of a second operator different from the first operator, and execute first lane change control of causing the vehicle to change a lane to an adjacent lane in the case in which it is determined that a lane change is possible on the basis of the surrounding situation when the first instruction information is acquired according to acquisition of the first instruction information, and transition to a standby state of the lane change in response to acquisition of the second instruction information, maintain a standby state until the lane change is possible on the basis of the surrounding situation, and when it is determined that the lane change is possible on the basis of the surrounding situation in the standby state, execute second lane change control of causing the vehicle to change the lane to an adjacent lane.

According to the aspects of (1) to (14), it is possible to improve convenience for an occupant (for example, a driver) of the vehicle. For example, since the lane change control is performed according to the operation, the occupant of the vehicle can choose lane change control according to the occupant's preference.

According to the aspect of (2), it is possible to allow the vehicle occupant's intentions to be reflected if the driver intends to make an early lane change.

According to the aspect of (3), the direction indicator can be turned on at an appropriate timing depending on the timing when the standby state ends and the lane change starts.

According to the aspect of (4), the direction indicator can be turned on at an appropriate timing before starting the lane change, so that the start of the lane change can be notified to other vehicles in the vicinity.

According to the aspect of (5), it is possible to realize the lane change that better reflects the intention of the vehicle occupant. The first lane change control is considered to be an operation in which the occupant checks the surroundings to some extent, since it is the occupant's intention to change lane at that timing. For this reason, by actively performing lane change, the vehicle's behavior can be made to match the occupant's intention. The second lane change control is a lane change based on the occupant's intention to change the lane at the timing when the system determines that the lane change is possible. For this reason, a larger safety margin allows for lane changes with ease.

According to the aspect of (6), the first lane change control allows lane changes to be made even if the distance between the vehicles or the time until reaching another vehicle is relatively short, while the second lane change control allows lane changes to be made with a larger safety margin.

According to the aspect of (7), the turn lever switch allows the occupant to control lane changes according to his/her intentions, while the button operation allows lane changes to be made with ease, prioritizing the system's determination. In this way, the lane change control can be used differently depending on the operator.

According to the aspect of (8), when the lane change control is not performed, it is possible to maintain the vehicle traveling in the traveling lane. For this reason, disturbances in traveling behavior of the vehicle are curbed even when the vehicle cannot change lanes.

According to the aspect of (9), since the vehicle continues to travel in the lane in which the vehicle was traveling in the standby state of the second lane change control, the traveling behavior in the standby state is stabilized.

According to the aspect of (10), it is possible to curb lane changes that occur without the occupant's intention when the occupant has forgotten about the lane change.

BRIEF DESCRIPTION OF THE DRAWINGS

FIG. 4 is a view for describing an example of a scene in which the first lane change control is not executed.

FIG. 5 is a view for describing an example of a scene in which the second lane change control is executed.

FIG. 6 is a view for comparing the first lane change control with the second lane change control.

DETAILED DESCRIPTION OF THE INVENTION

[Entire Configuration]

Figure 1:
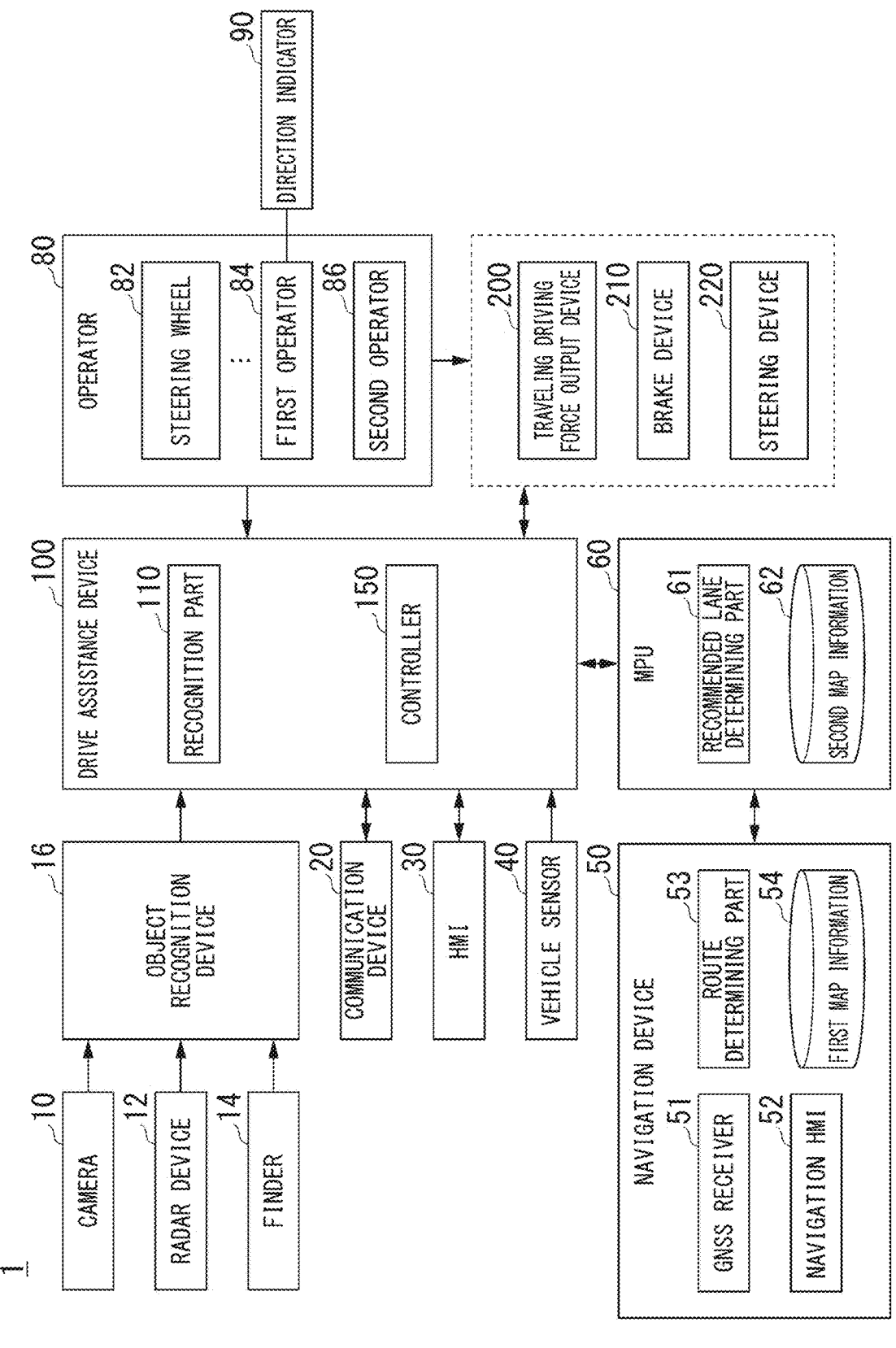
FIG. 1 is a configuration view of a vehicle system using a vehicle control system according to an embodiment.

FIG. 1 is a configuration view of a vehicle system 1 using a vehicle control system according to an embodiment. A vehicle in which the vehicle system 1 is mounted is, for example, a two-wheeled, three-wheeled or four-wheeled vehicle, and a driving source thereof is an internal combustion engine such as a diesel engine or a gasoline engine, an electric motor, or a combination of these. The electric motor runs on electricity generated by a generator connected to the internal combustion engine, or on electricity discharged from a secondary battery or fuel cells.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, an operator 80, a direction indicator 90, a driver assistance device 100, a traveling driving force output device 200, a brake device 210, and a steering device 220. These devices and equipment are connected to each other by multiple communication lines, such as a controller area network (CAN) communication line, serial communication lines, wireless communication networks, or the like. Further, the configuration shown in FIG. 1 is merely an example, and some of the configuration may be omitted, or other configuration may be added. The driver assistance device 100 is an example of "a vehicle control device."

The camera 10 is a digital camera using a solid-state imaging device such as a charge coupled device (CCD), a complementary metal oxide semiconductor (CMOS), or the like. The camera 10 is attached to an arbitrary place of a vehicle in which the vehicle system 1 is mounted (hereinafter, a vehicle M). When capturing an image of the front, the camera 10 is attached to a front windshield upper portion, a rearview mirror back surface, or the like. The camera 10 captures images of the surroundings of the vehicle M repeatedly, for example, periodically. The camera 10 may be a stereo camera.

The radar device 12 emits radio waves, such as millimeter waves, around the vehicle M and detects the radio waves reflected by objects (reflected waves) to detect at least a position (distance and azimuth) of the object. The radar device 12 is attached to an arbitrary place on the vehicle M. The radar device 12 may detect the position and speed of the object using a frequency modulated continuous wave (FM-CW) method.

The LIDAR 14 emits light (or electromagnetic waves with a wavelength close to the light) to the surroundings of the vehicle M, and measures scattered light. The LIDAR 14 detects the distance to the subject on the basis of the time between light emission and reception. The emitted light is, for example, a pulsed laser beam. The LIDAR 14 is attached to an arbitrary place on the vehicle M.

The object recognition device 16 performs sensor fusion processing on some or all of the detection results from the camera 10, the radar device 12, and the LIDAR 14 to recognize the position, the type, the speed, or the like, of the object. The object recognition device 16 outputs the recognition results to the driver assistance device 100. The object recognition device 16 may output the detection results of the camera 10, the radar device 12, and the LIDAR 14 to the driver assistance device 100 as they are. The object recognition device 16 may be omitted from the vehicle system 1.

The communication device 20 communicates with other vehicles in the vicinity of the vehicle M using, for example, a cellular network, a Wi-Fi network, Bluetooth (Registered trademark), dedicated short range communication (DSRC), etc., or communicates with various server devices via a wireless base station.

The HMI 30 presents various pieces of information to the occupant of the vehicle M and accepts input operations from the occupant. The HMI 30 includes various display devices, a speaker, a buzzer, a touch panel, a switch, a key, and the like. The HMI 30 includes a display device. The display device is, for example, a display device, so-called multi-information display, that is provided in a center portion of an installation panel of the vehicle M and displays various information about the vehicle M, such as a speed meter (speedometer) that indicates the traveling speed of the vehicle M, a rotation speed meter (tachometer) that indicates the rotation number (rotation speed) of the internal combustion engine equipped in the vehicle M, or the like.

The vehicle sensor 40 includes a vehicle speed sensor configured to detect a speed of the vehicle M, an acceleration sensor configured to detect acceleration, a yaw rate sensor configured to detect an angular speed around a vertical axis, an azimuth sensor configured to detect an orientation of the vehicle M, and the like.

The navigation device 50 includes, for example, a global navigation satellite system (GNSS) receiver 51, a navigation HMI 52, and a route determining part 53. The navigation device 50 holds first map information 54 on a storage device such as a hard disk drive (HDD), a flash memory, or the like. The GNSS receiver 51 specifies a position of the vehicle M on the basis of the signal received from a GNSS satellite. The position of the vehicle M may be specified or supplemented by an inertial navigation system (INS) using the output of the vehicle sensor 40. The navigation HMI 52 includes a display device, a speaker, a touch panel, a key, and the like. The navigation HMI 52 may be partially or completely shared with the HMI 30 described above. The route determining part 53 determines, for example, a route (hereinafter, a route on map) to a destination input by an occupant using the navigation HMI 52 from a position of the vehicle M (or an arbitrary position that was input) specified by the GNSS receiver 51 with reference to the first map information 54. The first map information 54 is, for example, information that represents a shape of a road using links that indicate roads and nodes connected by the links. The first map information 54 may include a curvature of a road, point of interest (POI) information, or the like. The route on map is output to the MPU 60. The navigation device 50 may perform route guidance using the navigation HMI 52 on the basis of the route on map. The navigation device 50 may be realized by, for example, a function of a terminal device such as a smartphone, a tablet terminal, or the like, held by the occupant. The navigation device 50 may transmit the current position and destination to a navigation server via the communication device 20, and acquire the same route as the route on map from the navigation server.

The MPU 60 includes, for example, a recommended lane determining part 61 and stores second map information 62 in a storage device such as a HDD, a flash memory, or the like. The recommended lane determining part 61 divides the route on map provided by the navigation device 50 into a plurality of blocks (for example, divides every 100 m in terms of a direction of advance of the vehicle) and determines a recommended lane for each block by referring to the second map information 62. The recommended lane determining part 61 determines which lane from the left to travel in. The recommended lane determining part 61 determines the recommended lane for the vehicle M when a branch point exists on the route on map, so that the vehicle M can travel a reasonable route to proceed to the branch destination. The recommended lane determining part 61 determines, for example, a lane that connects to the diverging road as the recommended lane when the vehicle M has reached to a predetermined distance before the diverging road on which the vehicle M is going to travel. The recommended lane determining part 61 and the second map information 62 may be functional parts or information contained in other devices, such as the driver assistance device 100 or the like.

The second map information 62 is map information more accurate than the first map information 54. The second map information 62 includes, for example, information of a lane center, information of a lane boundary, or the like. The second map information 62 may include road information, traffic regulation information, address information (address and postal code), facility information, telephone number information, and the like. The second map information 62 may be updated at any time by the communication device 20 communicating with other devices.

The operator 80 includes, for example, a steering wheel 82, as well as an accelerator pedal, a brake pedal, a shift lever, and other operators. The operator 80 is equipped with a sensor configured to detect the amount of operation or the presence or absence of operation, and the detection results are output to the driver assistance device 100, or some or all of the traveling driving force output device 200, the brake device 210, and the steering device 220. The steering wheel 82 does not necessarily have to be annular, and may be in the form of an irregular steering wheel, a joystick, a button, or the like. The operator 80 includes a first operator 84 and a second operator 86. The direction indicator 90 is turned on or off depending on the operation of the first operator 84. The first operator 84 and the second operator 86 will be described below in detail.

The driver assistance device 100 includes, for example, a recognition part 110 and a controller 150. The recognition part 110 and the controller 150 are realized by executing, for example, a program (software) using a hardware processor such as a central processing unit (CPU) or the like. Some or all of these components may be realized by hardware (circuit part; including circuitry) such as large scale integration (LSI), a application specific integrated circuit (ASIC), a field-programmable gate array (FPGA), a graphics processing unit (GPU), a system on chip (SOC), or the like, or cooperation of software and hardware. The program may be stored in a storage device such as an HDD, a flash memory, or the like, (a storage device including a non-transitory storage medium) of the driver assistance device 100, or may be stored in a detachable storage medium such as a DVD, a CD-ROM, or the like, in advance, or may be installed in a HDD or a flash memory of the driver assistance device 100 by mounting a storage medium (non-transitory storage medium) in a drive device.

The recognition part 110 recognizes a state of the object around the vehicle M such as a position, a speed, acceleration, or the like, on the basis of the information input from the camera 10, the radar device 12, and the LIDAR 14 via the object recognition device 16. The position of the object is recognized, for example, as a position on absolute coordinates using a representative point (a center of gravity, a driving shaft center, or the like) of the vehicle M as an origin, and used in control. The position of the object may be expressed by a representative point such as a center of gravity, corners of the object, or may be expressed by a region. The "state" of the object may include acceleration or jerk of the object, or "a behavioral state" (for example, whether lane change is performed or to be performed).

The recognition part 110 recognizes, for example, the lane in which the vehicle M is traveling (traveling lane). For example, the recognition part 110 recognizes the traveling lane by comparing a pattern of road division lines (for example, an arrangement of solid lines and broken lines) obtained from the second map information 62 with a pattern of road division lines around the vehicle M recognized from the image captured by the camera 10. The recognition part 110 may recognize a traveling lane by recognizing track boundaries (road boundaries), which are not limited to the road division lines but include road division lines, shoulders, curbs, median strips, guard rails, and the like. This recognition may take into account the position of the vehicle M obtained from the navigation device 50 and the processing results from the INS. The recognition part 110 recognizes stop lines, obstacles, red signals, toll gates, and other road incidents.

When recognizing the traveling lane, the recognition part 110 recognizes the position or posture of the vehicle M with respect to the traveling lane. The recognition part 110 may recognize, for example, a deviation of the reference point of the vehicle M from the lane center and an angle of the direction of advance of the vehicle M with respect to a line connecting the lane centers as the relative position and posture of the vehicle M with respect to the traveling lane. On the other hand, the recognition part 110 may recognize the position of the reference point of the vehicle M with respect to any side end portion of the traveling lane (road division lines or road boundaries) as the relative position of the vehicle M with respect to the traveling lane.

The controller 150 executes driver assistance control. The controller 150 automatically controls the traveling driving force output device 200 and the brake device 210, for example, without relying on the driver's operation, and automatically controls the speed of the vehicle M. The controller 150 executes so-called adaptive cruise control (ACC).

The controller 150 controls the steering device 220 so that the vehicle M does not deviate from the traveling lane. For example, the controller 150 controls the steering device 220 so that the vehicle M travels in the center or near the center of the traveling lane recognized by the recognition part 110. Hereinafter, the control may be referred to as "lane maintenance control." The controller 150 executes hands-on lane maintenance control, and hands-off lane maintenance control.

The hands-on lane maintenance control is control executed in a state in which a driver grips the steering wheel (a state in which a steering grip sensor (not shown) detects a grip of the steering wheel). A condition under which the hands-on lane maintenance control can be executed is more lenient than a condition in which the hands-off lane maintenance control can be executed.

The hands-off lane maintenance control is control executed in a state in which the driver does not grip the steering wheel (a state in which the steering grip sensor (not shown) does not detect a grip of the steering wheel). The hands-off lane maintenance control can be executed, for example, when the following conditions are satisfied. The conditions are as follows: a speed of the vehicle M is equal to or greater than a predetermined speed, the vehicle M is traveling a predetermined road (for example, a road or a type of a road which is set in advance that the hands-off lane maintenance control can be executed), and a driver is looking ahead. The hands-off lane maintenance control is performed when the driver is looking ahead, and is not performed or stops when the driver is not looking ahead.

The conditions under which the above-mentioned hands-on lane maintenance control and hands-off lane maintenance control can be executed are only examples, and other conditions (for example, the vehicle M following the preceding vehicle) may be included, or some conditions may be omitted. The conditions under which the hands-on lane maintenance control can be executed may be more lenient than the conditions under which the hands-off lane maintenance control can be executed (the conditions under which the hands-off lane maintenance control can be executed should be stricter than the conditions under which hands-on lane maintenance control can be executed). Further, the driver assistance device 100 recognizes whether the driver is looking ahead based on an image captured by a camera that captures an image of a driver (not shown).

The controller 150 causes the vehicle M to automatically change lanes. Details of the control will be described below. The automatic lane change control may be conditioned on the execution of the hands-off lane maintenance control or the hands-on lane maintenance control.

The traveling driving force output device 200 outputs a traveling driving force (torque) to the driving wheels so that the vehicle M travels. The traveling driving force output device 200 includes a combination of, for example, an internal combustion engine, an electric motor, and a gearbox, as well as an ECU that controls these. The ECU controls the above configuration according to the information input from the driver assistance device 100 or the information input from the operator 80.

The brake device 210 includes, for example, a brake caliper, a cylinder configured to transmit a hydraulic pressure to the brake caliper, an electric motor configured to generate a hydraulic pressure in the cylinder, and a brake ECU. The brake ECU controls the electric motor according to the information input from the driver assistance device 100 or the information input from the operator 80 so that the brake torque corresponding to the braking operation is output to each wheel.

The steering device 220 includes, for example, a steering ECU, and an electric motor. The electric motor applies, for example, a force to a rack and pinion mechanism to change a direction of a steered wheel. The steering ECU drives the electric motor and changes the direction of the steered wheels according to the information input from the driver assistance device 100 or the information input from the operator 80.

[Control Related to Lane Change]

In response to acquiring the first instruction information, when the controller 150 determines that a lane change is possible on the basis of the surrounding situation at the time when the first instruction information was acquired, it executes the first lane change control to change the vehicle M to the adjacent lane. The "time" when the first instruction information is acquired does not only refer to a specific point in time, but also to a certain length of time. In response to receiving the second instruction information, the controller 150 transitions to a lane change standby state, maintains the standby state until a lane change becomes possible based on the surrounding situation, and executes the second lane change control to change the vehicle M to the adjacent lane when it is determined that a lane change became possible based on the surrounding situation in the standby state. The second lane change control maintains the standby state of the lane change until a lane change becomes possible, even in a situation where a lane change is judged to be not possible due to the presence of other vehicles around the vehicle M, which is in surrounding situations, and when it is determined that a lane change became possible based on the surrounding situations in the standby state, it causes the vehicle M to change to the adjacent lane. When it is determined that the lane change is not possible on the basis of the surrounding situation, this may be due to other external environmental factors in addition to (or instead of) the presence of other vehicles around the vehicle M as described above. The other external environments are external environments that make the controller 150 hesitate to change lanes, such as the shape of the road such as a sharp curve, a change in the situation of the surroundings such as a sudden change in weather, or the like.

The first lane change control causes the vehicle M to change lanes after the first time has elapsed from the time the first instruction information is acquired, if there are no other vehicles around the vehicle that would interfere with the lane change of the vehicle M. The second lane change control causes the vehicle M to change lanes after the second time has elapsed from the time the second instruction information is acquired, when there are no other vehicles around the vehicle M that may interfere with the lane change of the vehicle M in the lane change standby state. The second time is a longer time than the first time. Even if the vehicle M is able to change lanes as described above, the lane change by the second lane change control is performed at a slower timing than the lane change by the first lane change control.

The first instruction information is transmitted to the controller 150 in response to an operation by the first operator 84. The first instruction information is the information (for example, signal) output from the first operator 84 when the first operator 84 is operated. The second instruction information is transmitted to the controller 150 in response to the operation of the second operator 86 different from the first operator 84. The second instruction information is information (for example, signal) output from the second operator 86, for example, when the second operator 86 is operated. The standby state is the state in which the vehicle M is traveling in a traveling lane without initiating the lane change (see description of FIG. 5, which will be described below in detail).

Figure 2:
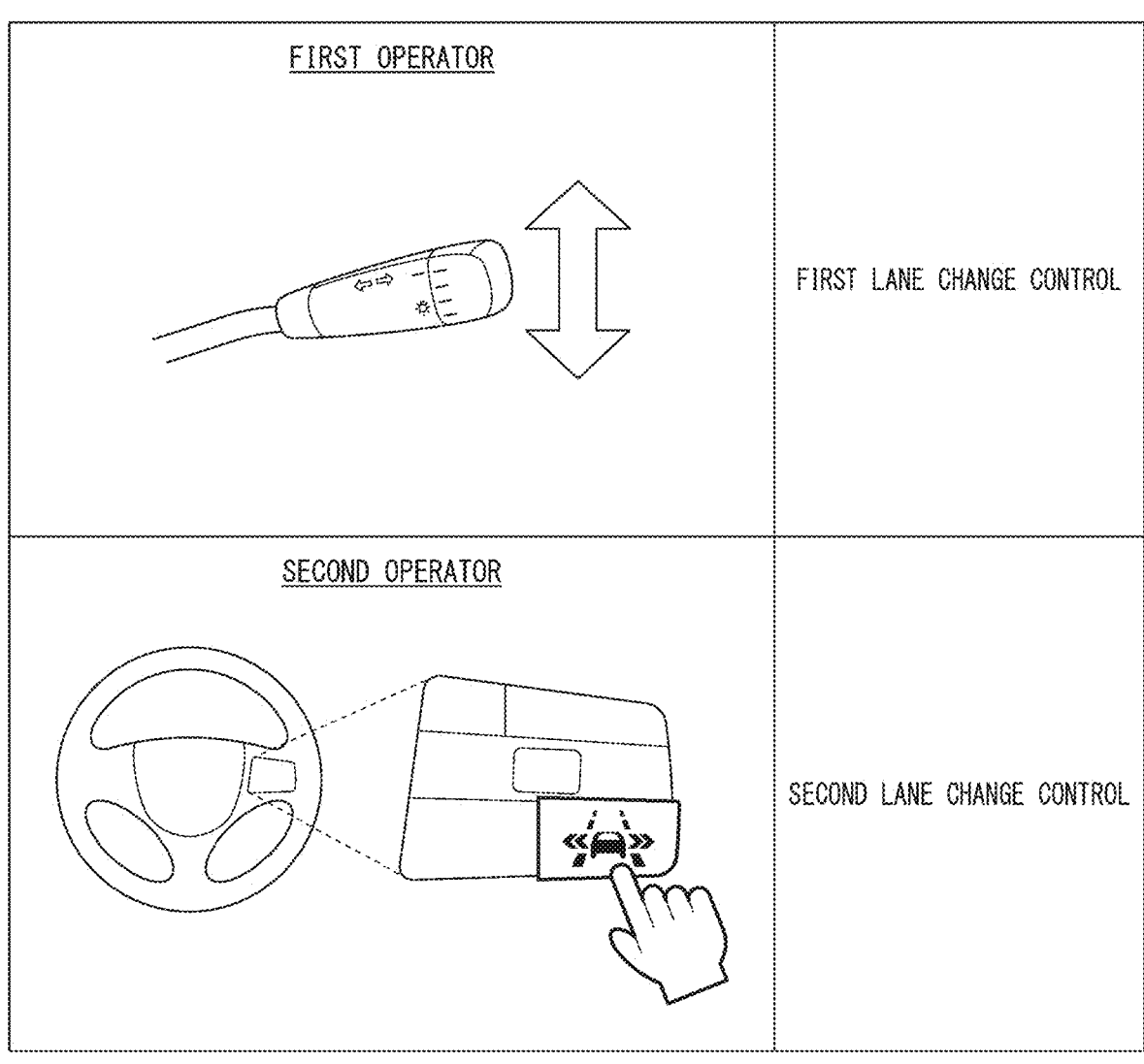
FIG. 2 is a view for describing a first operator, a second operator, first lane change control, and second lane change control.

FIG. 2 is a view for describing the first operator 84, the second operator 86, the first lane change control, and the second lane change control. The first operator 84 is, for example, a turn signal lever switch. For example, when the driver performs a predetermined operation on the first operator 84, the first operator 84 outputs the first instruction information. The predetermined operation is, for example, operating a turn signal lever switch for a predetermined time in the direction in which the lane change is intended, or pushing the turn signal lever switch to a predetermined position. More specifically, the predetermined operation is performed when the turn signal lever switch is operated for a predetermined time in a state that it is maintained at a predetermined position in the direction in which the lane change is intended. The first lane change control is executed in response to the operation of the first operator 84.

The second operator 86 is, for example, a button switch. The second operator 86 is attached to, for example, a position that is easy for the driver to operate, such as on the steering wheel spoke or on the installment panel, as shown in FIG. 2. For example, when the driver performs a predetermined operation on the second operator 86 (operates the button), the second operator 86 outputs the second instruction information. The second lane change control is executed in response to the operation of the second operator 86.

Further, the first operator 84 or the second operator 86 may be a button on a touch panel or some other aspect, instead of the above-mentioned. The first operator 84 is, for example, a button or other aspect used for the operation of the direction indicator 90, and the second operator 86 may be any aspect different from the first operator 84.

[First Lane Change Control]

Figure 3:
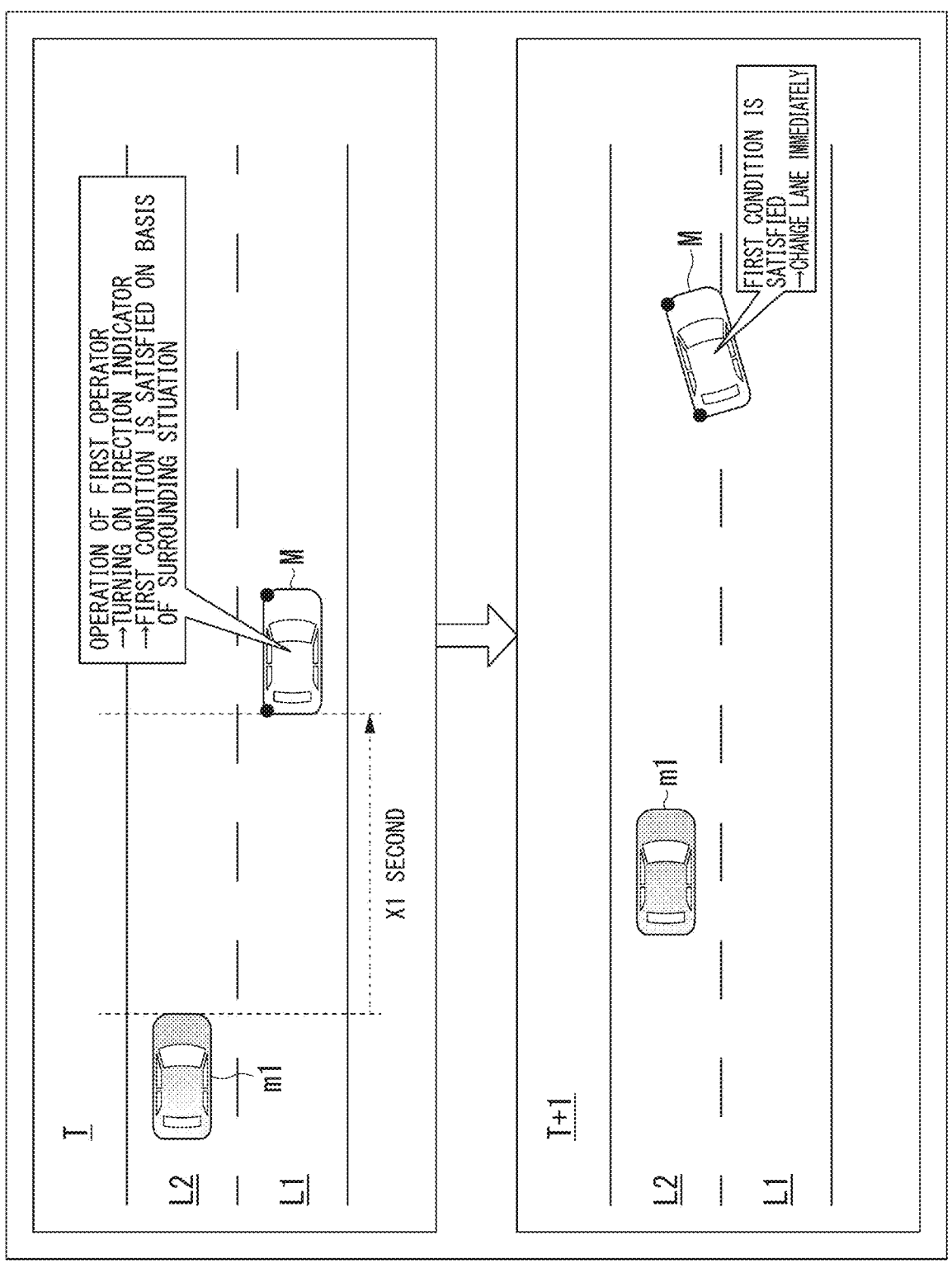
FIG. 3 is a view for describing an example of a scene in which the first lane change control is executed.

FIG. 3 is a view for describing an example of a scene where the first lane change control is executed. At a time T, it is assumed that the driver has performed an operation on the first operator 84 to automatically change lanes of the vehicle M from a lane L1 to a lane L2. The lane L1 is a lane along which the vehicle M is traveling. The lane L2 is a lane adjacent to the lane L1. The controller 150 turns on the direction indicator 90 in response to the above-mentioned operation. The controller 150 turns on the direction indicator 90 when the first operator 84 is operated. For example, the direction indicator 90 is turned on at the timing when the operation is performed.

Further, the controller 150 determines whether the vehicle M can change lanes from the lane L1 to the lane L2 on the basis of the surrounding situation in response to the above-mentioned operation. For example, it is determined whether the lane change is possible when the above-mentioned operation is performed or during a predetermined time period from the time the operation is performed. The controller 150 determines that the lane change is possible, for example, when the first condition is satisfied. The first condition is that the degree of interference with the traveling of surrounding vehicles, for example, another vehicle m1 traveling in the lane L2, is equal to or smaller than the first threshold. The first condition satisfies, for example, one or both of that the distance in the direction of advance between the other vehicle m1 present in the lane of the lane change destination of the vehicle M and the vehicle M is equal to or greater than the first threshold, and that the time it takes for the other vehicle m1 to reach the reference position set with respect to the vehicle M is equal to or greater than the second threshold. In the following example, it is assumed that the first condition is satisfied when both conditions are satisfied, and the first condition is not satisfied when either condition is not satisfied.

In the example of FIG. 3, the distance from the vehicle M to the other vehicle m1 is equal to or greater than the first threshold, and the time it takes for the other vehicle m1 to reach the reference position set with respect to the vehicle M (X1 in FIG. 3) is equal to or greater than the second threshold. When the controller 150 determines that the first condition is satisfied, it causes the vehicle M to change lanes to the lane L2 within a predetermined time (immediately). In the example of FIG. 3, at the time T+1, the controller 150 causes the vehicle to change a lane in front of the other vehicle m1. Further, in this example, the direction indicator may be turned on after the first condition is satisfied. As described above, the controller 150 can quickly change lanes of the vehicle M in response to an operation by the first operator 84.

Figure 4:
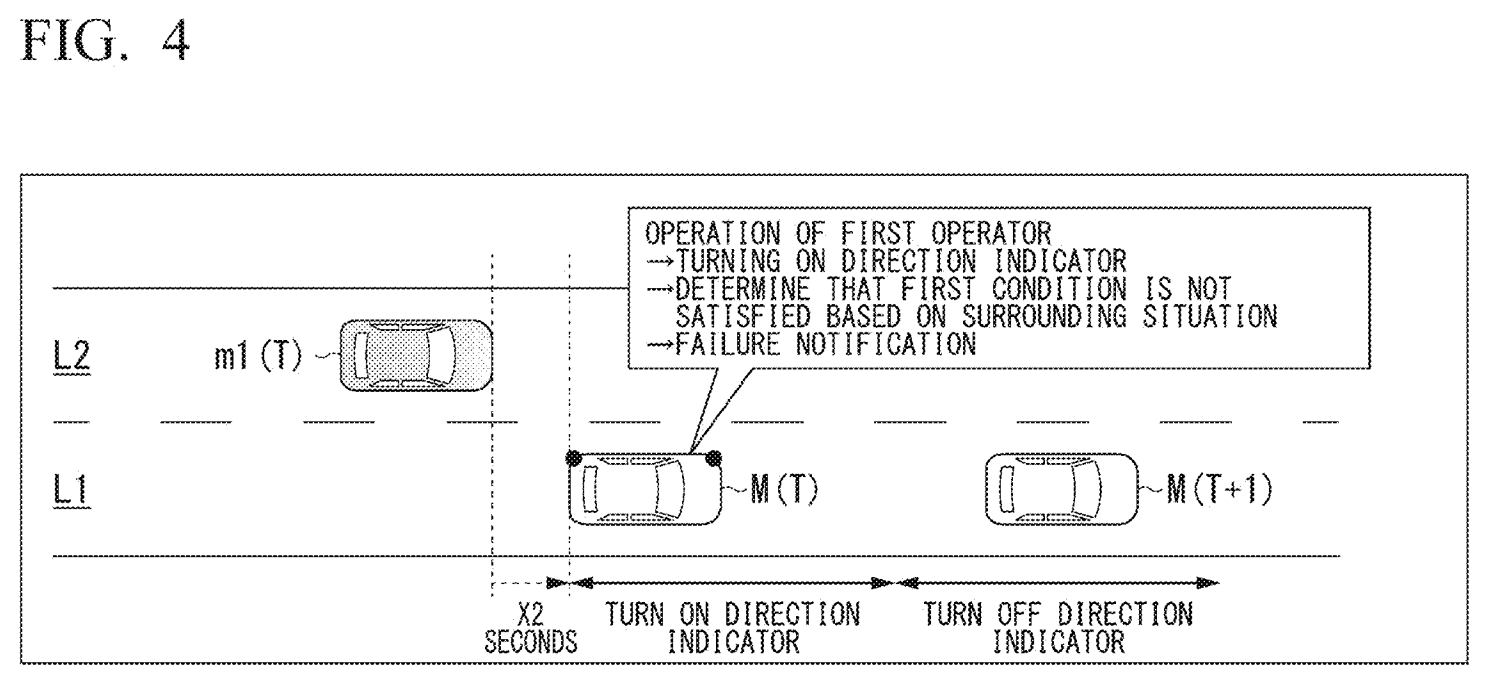

FIG. 4 is a view for describing an example of a scene where the first lane change control is not executed. At the time T, it is assumed that the driver has performed an operation on the first operator 84 to automatically change lanes of the vehicle M from the lane L1 to the lane L2. The controller 150 turns on the direction indicator 90 in response to the above-mentioned operation. The controller 150 turns on the direction indicator 90 when the first operator 84 is operated.

Further, the controller 150 determines whether the first condition is satisfied in response to the above-mentioned operation. In the example in FIG. 4, the distance from the vehicle M to the other vehicle m1 is less than the first threshold, and the time it takes for the other vehicle m1 to reach the reference position set with respect to the vehicle M (X2 in FIG. 4) is less than the second threshold. At the time T, the controller 150 determines that the first condition is not satisfied and notifies the driver of a failure notification indicating that the first lane change control cannot be performed. That is, the first lane change control is cancelled. The notification may be, for example, by using sound or image, or by vibrating the steering wheel, a driver seat, a driver's seatbelt, or the like. For example, the controller 150 uses the HMI 30 to output a sound for failure notification. In addition, the controller 150 turns off the direction indicator 90. The timing for turning off the direction indicator 90 may be before the failure notification, after the failure notification, or at the same timing as the failure notification. In the case of the operation input of the one-touch turn signal, the direction indicator 90 may be turned on the number of times corresponding to the one-touch turn signal (for example, three times) and may remain in the off state after the above-mentioned number of times of the one-touch turn signal has been performed, and the direction indicator 90 may be turned on or off again depending on the determination as to whether the lane change is possible thereafter. The one-touch turn signal is a function that turns on the direction indicator 90 a predetermined number of times and then turns off automatically when the turn signal lever switch is operated to a predetermined degree (for example, lightly operated). In addition, when the first operator 84 is a switch different from the turn signal lever switch, the direction indicator 90 does not need to be turned on until the timing when the vehicle M makes a lane change.

At the time T+1, which is a predetermined time after the failure notification is notified, the controller 150 controls the vehicle M to travel in the lane L1. When the controller 150 determines that the lane change is not possible on the basis of the surrounding situation at the time the first instruction information was received in response to receiving the first instruction information, it causes the vehicle M to maintain traveling in the lane in which the vehicle M is traveling. As described above, the controller 150 can realize the control according to the surrounding situation.

[Second Lane Change Control]

Figure 5:
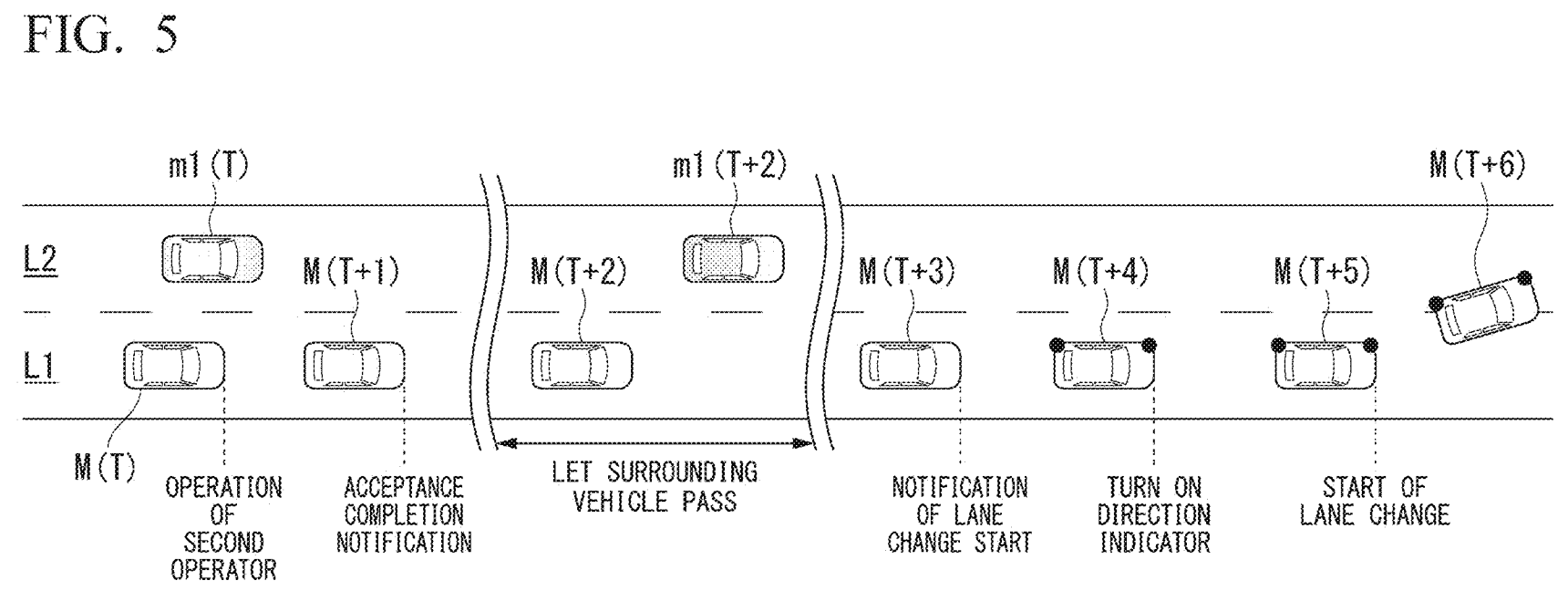

FIG. 5 is a view for describing an example of a scene where the second lane change control is executed. At the time T, it is assumed that the driver has performed an operation on the second operator 86 to automatically change lanes of the vehicle M from the lane L1 to the lane L2. At the time T+1, the controller 150 accepts the lane change and notifies the driver that acceptance has been completed. The notification is done by the sound, image, vibration, or the like, as mentioned above.

Upon receiving the lane change, the controller 150 determines whether the second condition is satisfied. The second condition is to satisfy one or both of the following conditions: the distance in the direction of advance between the other vehicle m1 present in the lane of the lane change destination of the vehicle M and the vehicle M is equal to or greater than a third threshold; and the time it takes for the other vehicle ml to reach the reference position set with respect to the vehicle M is equal to or greater than a fourth threshold. In the following example, it is assumed that the second condition is satisfied when both conditions are satisfied, and the second condition is not satisfied when either one is not satisfied.

The second condition is a condition that is more severe to satisfy than the first condition (a condition that is difficult to achieve). The second condition is a condition in which the degree to which the vehicle M interferes with the traveling of other vehicles when the vehicle M changes lanes is lower than in the first condition. A low degree of interference means that the speed changes of other vehicles are less likely to occur, and that a lane change by the vehicle M has a smaller impact on the drivers of other vehicles. For example, the third threshold is a distance greater than the first threshold of the first lane change control. For example, the fourth threshold is a time greater than the second threshold of the first lane change control.

In the example of FIG. 5, the distance from the vehicle M to the other vehicle ml is less than the third threshold, and the time it takes for the other vehicle ml to reach the reference position set with respect to the vehicle M is less than the fourth threshold. In this case, at the time T+2, the controller 150 maintains the state of having the vehicle M travel in the lane L1 (maintaining the vehicle M traveling in the lane in which the vehicle M is traveling) in the standby state of the second lane change control and let the other vehicle ml pass. The term "let it pass" means to stand by until the other vehicle ml has overtaken the vehicle M.

After the other vehicle ml overtakes the vehicle M, at the time T+3, the controller 150 notifies the driver of the start of the vehicle change. The notification is done by the sound, image, vibration, or the like, as mentioned above. In the above-mentioned example, the example of "let it pass" based on the vehicle M, in which the other vehicle ml waits until it overtakes the vehicle M, has been explained, but similar processing may also be performed in the case of "let it pass" based on the other vehicle ml, in which the vehicle M overtakes the other vehicle ml and waits until the vehicle M is a predetermined distance away from the other vehicle ml.

After the notification, at the time T+4, the controller 150 turns on the direction indicator 90. For example, when the second operator 86 is operated, the controller 150 does not turn on the direction indicator from the time the operation is performed until the standby state ends, and turns on the direction indicator 90 after the standby state ends. When the controller 150 determines that the lane change is possible on the basis of the surrounding situation in the standby state of the second lane change control, it turns on the direction indicator 90 before the predetermined time at which it begins to change the lane of the vehicle M to the adjacent lane.

The "standby state" is the state between the first timing and the second timing. The first timing is the timing when the second operator 86 has completed its operation or lane change acceptance. The second timing is the timing determined to satisfy the second condition, the timing to turn on the direction indicator 90 (for example, the timing immediately before turning it on), the timing to notify the start of a lane change, the timing at which the lane change starts, or any predetermined timing related to any of these.

At the predetermined time, at the time T+5 after turning on the direction indicator 90, the controller 150 starts the lane change for the vehicle M. At the time T+6, the controller 150 causes the vehicle M to enter the lane L2.

As described above, the controller 150 can cause the vehicle M to change lanes, letting other vehicles pass, even if other vehicles are in the lane of the lane change destination.

In this way, in the case of the first lane change control, if the lane change is not possible on the basis of the surrounding situation at the time when the driver expresses his/her intention to change lanes (when the first operator 84 is operated), the first lane change control will be canceled. Since the driver wants to change lanes at the timing when the first operator 84 is operated, if the lane change cannot be made at this timing, canceling the lane change early reflects the driver's intention.

On the other hand, in the second lane change control, the driver expresses his/her intention to make the lane change at the appropriate timing (the operation of the second operator 86). For this reason, even if the second lane change control is unable to change lanes on the basis of the surrounding situation, the second lane change control will not be cancelled and will keep the vehicle M on standby until suitable timing arrives. Then, when the appropriate timing arrives, the second lane change control causes the vehicle M to change lanes. When the driver operates the second operator 86, the driver wants to change lanes at a more suitable timing, not at the timing when the second operator 86 is operated, and therefore, even if the lane change cannot be made at the timing when the second operator 86 is operated, changing the lane of the vehicle M after the standby is reflecting the driver's intention.

Accordingly, the driver can perform lane changes according to his/her own intention, convenience is improved. For example, when the driver wants to travel in front of the other vehicle ml as much as possible or when the driver wants to reach the lane closest to the diverging road as quickly as possible, the driver operates the first operator 84. In this case, the first lane change control is executed according to the above-mentioned intention. When the driver wants to change lanes in a way that affects the other vehicle ml as little as possible, or when the driver wants to change lanes at a timing that is optimal for the surrounding situation, the driver operates the second operator 86. In this case, the second lane change control is executed according to the above-mentioned intention. Accordingly, this improves convenience for drivers.

[Comparison of First Lane Change Control with Second Lane Change Control]

Figure 6:
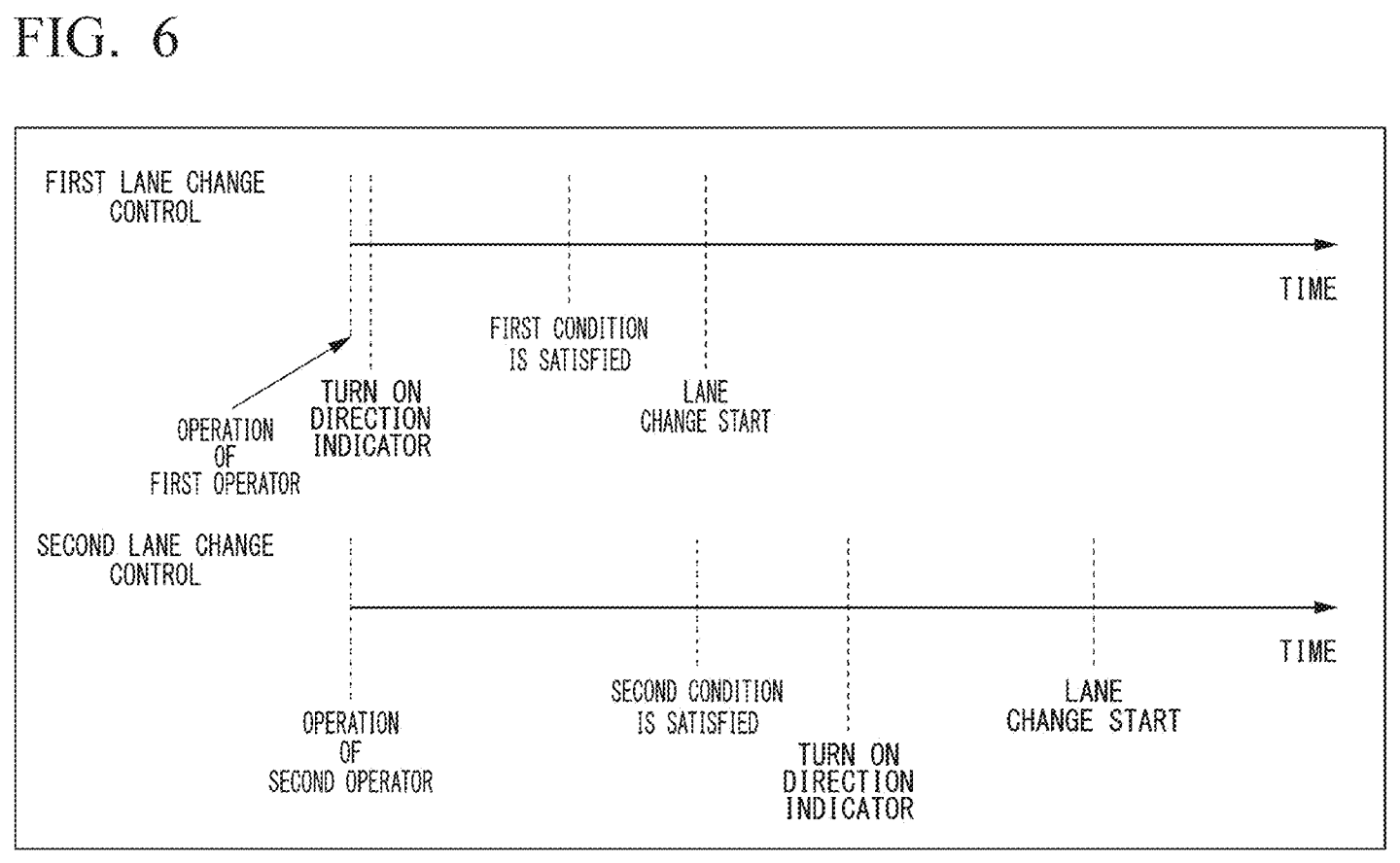

FIG. 6 is a view for comparing the first lane change control with the second lane change control. In the example of FIG. 6, it is assumed that there are no other vehicles nearby that would interfere with the lane change of the vehicle M, and that the vehicle M is able to change lanes at any time. The controller 150 turns on the direction indicator 90 when the first operator 84 is operated, and starts the lane change when the first condition is satisfied. In the first lane change control, when the driver's intention to change lanes is expressed by the second lane change control (described later) (when the first operator 84 is operated), the direction indicator 90 is turned on at early timing, and the lane change is started. The first lane change control is control that respects the driver's intention to make a lane change at the timing when the first operator 84 is performed. In the first lane change control, the first condition described above is more lenient than the second condition, and is therefore more likely to reflect the driver's intention.

When the second operator 86 is operated, the controller 150 turns on the direction indicator 90 and starts the lane change if the second condition is satisfied. The timing to turn on the direction indicator 90 in the second lane change control is, for example, slower than the timing to turn on the direction indicator 90 in the first lane change control. The timing to start a lane change in the second lane change control is, for example, slower than the timing to start a lane change in the first lane change control. The timing to determine that the second condition of the second lane change control is satisfied is, for example, slower than the timing to determine that the first condition of the first lane change control is satisfied.

As described above, the timing of lane change operations of the first lane change control is faster than the timing of lane change operations of the second lane change control, the driver recognizes this characteristics or the control intention for lane changes and operates the first operator 84 or the second operator 86, and thus, control that is more in response to the driver's intention can be realized, improving convenience for users.

In the above, in a situation where lane change is possible at any time, the timing of lane change operations of the first lane change control and the timing of lane change operations of the second lane change control are described as being different, but alternatively, the timing of these may be the same.

[Flowchart (First Lane Change Control)]

Figure 7:
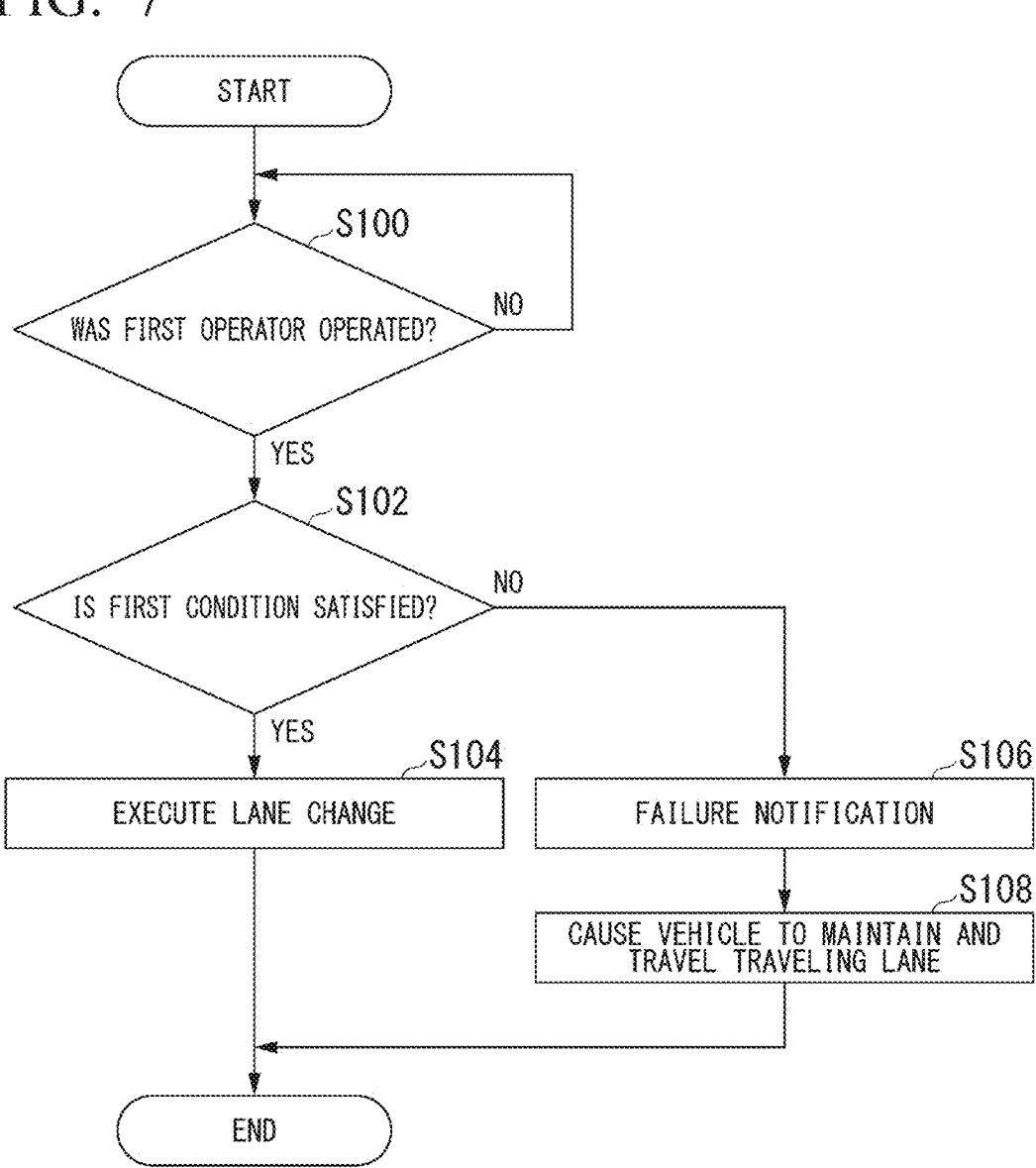
FIG. 7 is a flowchart showing an example of a flow of processing of the first lane change control.

FIG. 7 is a flowchart showing an example of a flow of processing of the first lane change control. First, the controller 150 determines whether the first operator 84 is operated (step S100). When the first operator 84 is operated, the controller 150 turns on the direction indicator 90 and determines whether the first condition is satisfied (step S102). When the first condition is satisfied, the controller 150 causes the vehicle M to change lanes (step S104). The direction indicator 90 may be turned on at the timing of step S104 instead of at the timing of step S102. That is, the timing of turning on of the direction indicator 90 may be the timing in response to the lane changes. For example, when the first operator 84 is a switch other than the turn signal lever switch, the direction indicator 90 may be turned on at the timing of step S104.

When the first condition is not satisfied, the controller 150 notifies the driver of an acceptance failure notification indicating that the vehicle change cannot be accepted (step S106). Next, the controller 150 causes the vehicle M to travel while maintaining the traveling lane (step S108). Accordingly, processing of one routine of the flowchart is terminated. As described above, when the first condition is satisfied, the controller 150 can execute an early lane change of the vehicle M according to the timing of the operation of the first operator 84.

[Flowchart (Second Lane Change Control)]

Figure 8:
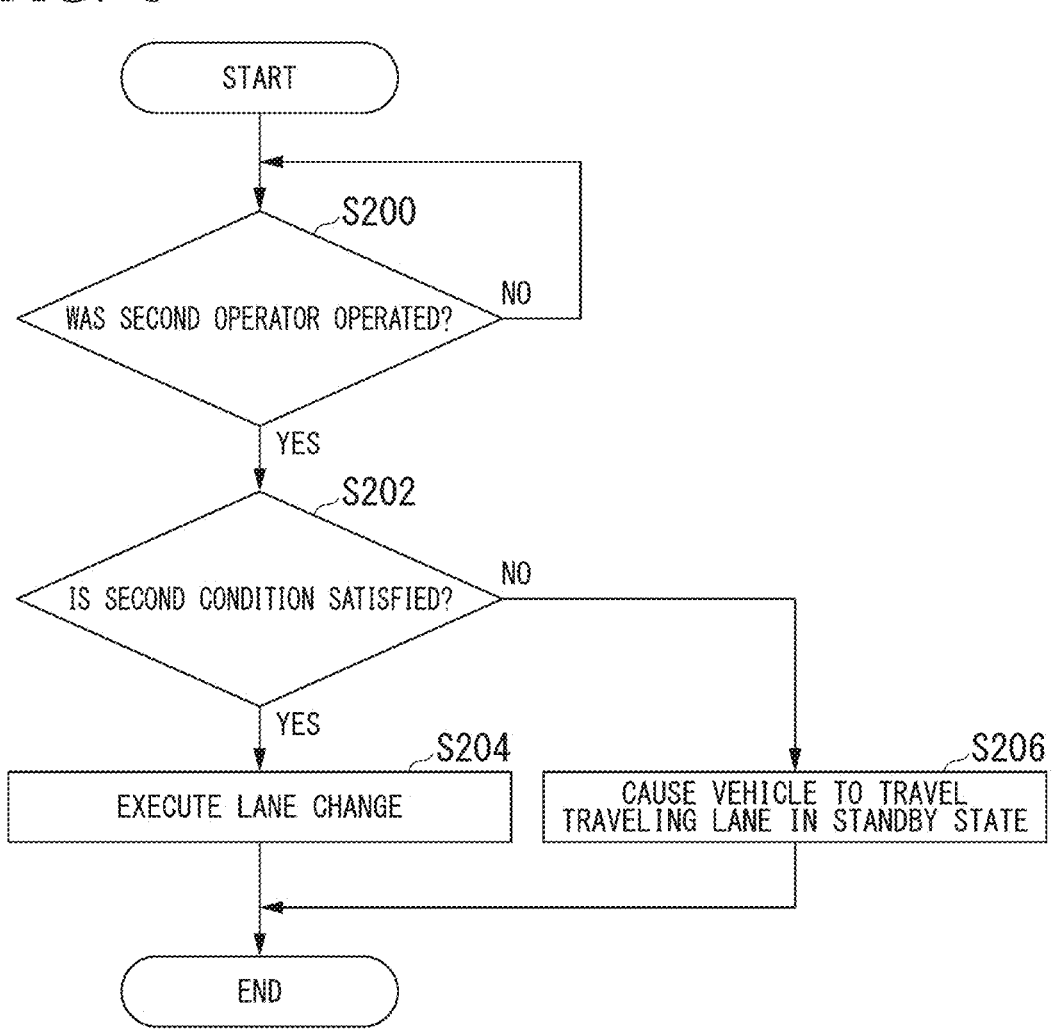
FIG. 8 is a flowchart showing an example of a flow of processing of the second lane change control.

FIG. 8 is a flowchart showing an example of a flow of processing of the second lane change control. First, the controller 150 determines whether the second operator 86 is operated (step S200). When the second operator 86 is operated, the controller 150 determines whether the second condition is satisfied (step S202). When the second condition is satisfied, the controller 150 causes the vehicle M to change lanes (step S204). For example, as described in FIG. 5, the lane change starts after notification of the start of lane change and turning on of the direction indicator 90. Accordingly, the processing of one routine of this flowchart is terminated.

When the second condition is not satisfied, the controller 150 causes the vehicle M to travel in the traveling lane in the standby state (step S206), and returns to the processing of step S202. In this way, the vehicle M will be in standby state until the second condition is satisfied. The controller 150 may cancel execution of the second lane change control when the standby state continues for a predetermined time or when the vehicle M travels a predetermined distance in the standby state.

As described above, the controller 150 can let the other vehicle ml pass in the standby state and execute the lane change for the vehicle M even if the second condition is not satisfied.

According to the above-mentioned embodiment, when the controller 150 determines that the lane change is possible on the basis of the surrounding situation at the time of acquiring the first instruction information, the controller executes the first lane change control to change the vehicle M to the adjacent lane, transitions to a lane change standby state according to acquisition of the second instruction information, and maintains the standby state until the lane change becomes possible on the basis of the surrounding situation, and when it is determined that the lane change became possible on the basis of the surrounding situation in the standby state, the controller executes the second lane change control to change the vehicle M to the adjacent lane, thereby improving convenience for the occupant of the vehicle (for example, the driver).

The above-mentioned embodiment can be expressed as follows.

A control device including:

a storage device on which a program is stored;

a hardware processor, the hardware processor causing a program stored on the storage device to execute:

processing of recognizing a surrounding situation of a vehicle; and processing of automatically controlling steering of the vehicle and performing automatic lane change on the basis of the recognized surrounding situation and instruction information that is a lane change instruction, the instruction information including first instruction information transmitted in response to an operation of a first operator and second instruction information transmitted in response to an operation of a second operator different from the first operator, in the case in which it is determined that the lane change is possible on the basis of the surrounding situation when the first instruction information is acquired in response to acquisition of the first instruction information, executing first lane change control to cause the vehicle to change the lane to an adjacent lane, and transitioning to a standby state of the lane change in response to acquisition of the second instruction information, maintaining the standby state until the lane change becomes possible on the basis of the surrounding situation, and when it is determined that the lane change became possible on the basis of the surrounding situation in the standby state, executing second lane change control to cause the vehicle to change the lane to an adjacent lane.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle control device comprising:
a recognition part configured to recognize a surrounding situation of a vehicle; and
a controller configured to automatically control steering of the vehicle and perform automatic lane change on the basis of the surrounding situation recognized by the recognition part and instruction information that is a lane change instruction,
wherein the instruction information includes first instruction information transmitted in response to an operation of a first operator and second instruction information transmitted according to an operation of a second operator different from the first operator, and
the controller executes first lane change control of causing the vehicle to change lane to an adjacent lane in the case in which it is determined that lane change is possible on the basis of the surrounding situation when the first instruction information is acquired according to acquisition of the first instruction information, and
the controller transitions to a standby state of lane change in response to acquisition of the second instruction information, maintains the standby state until lane change becomes possible on the basis of the surrounding situation, and when it is determined that lane change became possible on the basis of the surrounding situation in the standby state, executes second lane change control of causing the vehicle to change lane to the adjacent lane.

2. The vehicle control device according to claim 1, wherein the controller turns on a direction indicator when the first operator is operated.

3. The vehicle control device according to claim 1, wherein, when the second operator was operated, the controller does not turn on a direction indicator from the time when the operation of the second operator was performed until the standby state ends, and turns on the direction indicator after the standby state has ended.

4. The vehicle control device according to claim 3, wherein, when the controller determined that the lane change is possible on the basis of the surrounding situation in the standby state of the second lane change control, the controllers turns on the direction indicator before a predetermined time at which the controller causes the vehicle to start change of the lane to the adjacent lane.

5. The vehicle control device according to claim 1, wherein the controller determines that the lane change is possible when a first condition is satisfied and executes the first lane change control, and
determines that the lane change is possible when a second condition that is more severe to satisfy than the first condition is satisfied and executes the second lane change control.

6. The vehicle control device according to claim 5, wherein the first condition and the second condition is to satisfy one or both of: a distance in a direction of advance of the vehicle between the vehicle and another vehicle existing in a lane of a lane change destination of the vehicle is equal to or greater than a first threshold, and a time it takes for the other vehicle to reach a reference position set with respect to the vehicle is equal to or greater than a second threshold.

7. The vehicle control device according to claim 1, wherein the first operator is a turn signal lever switch, and the second operator is a button switch.

8. The vehicle control device according to claim 1, wherein the controller causes the vehicle to maintain the lane in which the vehicle is traveling when it is determined that the lane change is not possible on the basis of the surrounding situation at the time of receiving the first instruction information, in response to acquisition of the first instruction information.

9. The vehicle control device according to claim 1, wherein the controller causes the vehicle to maintain the lane in which the vehicle is traveling in the standby state of the second lane change control.

10. The vehicle control device according to claim 9, wherein the controller cancels execution of the second lane change control in response to acquisition of the second instruction information when the standby state has continued for a predetermined time or when the vehicle has traveled a predetermined distance in the standby state.

11. The vehicle control device according to claim 1, wherein, in the standby state of the lane change, the second lane change control maintains a standby state until the lane change is possible even in a situation in which it is determined that the lane change is not possible due to existence of another vehicle present around the vehicle that is the surrounding situation, and causes the vehicle to change the lane to the adjacent lane when it is determined that the lane change is possible on the basis of the surrounding situation in the standby state.

12. The vehicle control device according to claim 1, wherein the first lane change control causes the vehicle to change the lane after a first time elapses from acquisition of the first instruction information when there is no vehicle around the vehicle that could interfere with the lane change of the vehicle,
the second lane change control causes the vehicle to change the lane after a second time elapses from acquisition of the second instruction information when there are no vehicles around the vehicle that could interfere with the lane change of the vehicle in the standby state of the lane change, and
the second time is a time greater than the first time.

13. A vehicle control method of causing a computer to:
recognize a surrounding situation of a vehicle;
automatically control steering of the vehicle and perform automatic lane change on the basis of the recognized surrounding situation and instruction information that is a lane change instruction,
the instruction information including first instruction information transmitted in response to an operation of a first operator and second instruction information transmitted in response to an operation of a second operator different from the first operator, and
execute first lane change control of causing the vehicle to change a lane to an adjacent lane in the case in which it is determined that a lane change is possible on the basis of the surrounding situation when the first instruction information is acquired according to acquisition of the first instruction information, and
transition to a standby state of the lane change in response to acquisition of the second instruction information, maintain the standby state until the lane change becomes possible on the basis of the surrounding situation, and when it is determined that the lane change became possible on the basis of the surrounding situation in the standby state, execute second lane change control of causing the vehicle to change the lane to the adjacent lane.

14. A computer-readable non-transitory storage medium on which a program is stored to cause a computer to:

recognize a surrounding situation of a vehicle;

automatically control steering of the vehicle and perform automatic lane change on the basis of the recognized surrounding situation and instruction information that is a lane change instruction, the instruction information including first instruction information transmitted in response to an operation of a first operator and second instruction information transmitted in response to an operation of a second operator different from the first operator, and execute first lane change control of causing the vehicle to change a lane to an adjacent lane in the case in which it is determined that a lane change is possible on the basis of the surrounding situation when the first instruction information is acquired according to acquisition of the first instruction information, and transition to a standby state of the lane change in response to acquisition of the second instruction information, maintain the standby state until the lane change becomes possible on the basis of the surrounding situation, and when it is determined that the lane change became possible on the basis of the surrounding situation in the standby state, execute second lane change control of causing the vehicle to change the lane to the adjacent lane.

\* \* \* \* \*